(12) United States Patent
Shin et al.

(10) Patent No.: US 10,191,205 B2
(45) Date of Patent: Jan. 29, 2019

(54) BACKLIGHT SOURCE, BACKLIGHT UNIT, DISPLAY APPARATUS, AND FABRICATING METHOD THEREOF

(71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Mookeun Shin, Beijing (CN); Jinfeng Zhang, Beijing (CN)

(73) Assignees: BOE TECHNOLOGY GROUP CO., LTD., Beijing (CN); HEFEI XINSHENG OPTOELECTRONICS TECHNOLOGY CO., LTD, Hefei (CN)

( * ) Notice: Subject to any disclaimer, the term of this patent is extended or adjusted under 35 U.S.C. 154(b) by 0 days.

(21) Appl. No.: 15/527,848

(22) PCT Filed: Nov. 16, 2016

(86) PCT No.: PCT/CN2016/106046
§ 371 (c)(1),
(2) Date: May 18, 2017

(87) PCT Pub. No.: WO2017/128815
PCT Pub. Date: Aug. 3, 2017

(65) Prior Publication Data
US 2018/0106955 A1    Apr. 19, 2018

(30) Foreign Application Priority Data
Jan. 29, 2016 (CN) .......................... 2016 1 0067030

(51) Int. Cl.
*F21V 8/00* (2006.01)
*F21V 9/30* (2018.01)

(52) U.S. Cl.
CPC .............. *G02B 6/0068* (2013.01); *F21V 9/30* (2018.02); *G02B 6/009* (2013.01); *G02B 6/0011* (2013.01);
(Continued)

(58) Field of Classification Search
CPC .... G02B 6/0068; G02B 6/009; G02B 6/0065; G02B 6/0016; G02B 6/0026; G02B 6/0073; G02B 6/0011; F21V 9/30; F21V 9/16
See application file for complete search history.

(56) References Cited

U.S. PATENT DOCUMENTS

2009/0116261 A1* 5/2009 Chen .................... G02B 6/0068
362/609
2013/0241394 A1* 9/2013 Nakagawa ......... C09K 11/7734
313/503
(Continued)

FOREIGN PATENT DOCUMENTS

CN    202008088 U    10/2011
CN    103728774 A    4/2014
(Continued)

OTHER PUBLICATIONS

Machine English Translation CN204558533U dated Aug. 2015 Li Junmei.*
(Continued)

*Primary Examiner* — Anh Mai
*Assistant Examiner* — Glenn Zimmerman
(74) *Attorney, Agent, or Firm* — Anova Law Group, PLLC

(57) ABSTRACT

In accordance with various embodiments of the disclosed subject matter, a backlight source, a related backlight unit, a related display apparatus, and fabricating methods thereof are provided. In some embodiments, the disclosed backlight
(Continued)

source for a display panel can comprises: a light-bar; and a plurality of first light sources and a plurality of second light sources alternatively located on the light-bar in a staggered arrangement; wherein the plurality of first light sources use a first type phosphor that is able to realize a first color gamut range, while the plurality of second light sources use a second type phosphor that is able to realize a second color gamut range.

11 Claims, 1 Drawing Sheet

(52) U.S. Cl.
CPC ......... *G02B 6/0016* (2013.01); *G02B 6/0026* (2013.01); *G02B 6/0065* (2013.01); *G02B 6/0073* (2013.01)

(56) References Cited

U.S. PATENT DOCUMENTS

| | | | |
|---|---|---|---|
| 2014/0126185 A1 | 5/2014 | Hsieh et al. | |
| 2014/0347880 A1* | 11/2014 | Kuo | G02B 6/0073 362/606 |
| 2016/0212804 A1* | 7/2016 | Peeters | C09K 11/0883 |
| 2016/0356944 A1 | 12/2016 | Zhou | |

FOREIGN PATENT DOCUMENTS

| | | | | |
|---|---|---|---|---|
| CN | 104075187 A | | 10/2014 | |
| CN | 104375236 A | | 2/2015 | |
| CN | 204558533 U | * | 8/2015 | |
| CN | 105700230 A | | 6/2016 | |
| KR | 20110108147 A | | 10/2011 | |
| WO | WO 2007018361 A1 | * | 2/2007 | ........... G02B 6/0016 |
| WO | 2010013893 A1 | | 2/2010 | |
| WO | WO 2014202456 A1 | * | 12/2014 | ......... C09K 11/0883 |

OTHER PUBLICATIONS

The World Intellectual Property Organization (WIPO) International Search Report and Written Opinion for PCT/CN2016/106046 dated Mar. 2, 2017 13 Pages.
State Intellectual Property Office of the P.R.C (SIPO) Office Action 1 for 2016100670303 dated Jun. 29, 2017 14 Pages.

* cited by examiner

BACKLIGHT SOURCE, BACKLIGHT UNIT, DISPLAY APPARATUS, AND FABRICATING METHOD THEREOF

CROSS-REFERENCES TO RELATED APPLICATIONS

This application is a national phase entry under 35 U.S.C. § 371 of PCT patent application No. PCT/CN2016/106046, filed on Nov. 16, 2016, which claims priority of Chinese Patent Application No. 201610067030.3, filed on Jan. 29, 2016, the entire contents of both of which are incorporated by reference herein.

TECHNICAL FIELD

The disclosed subject matter generally relates to the display technologies and, more particularly, relates to a backlight source, a related backlight unit, a related display apparatus, and fabricating methods thereof.

BACKGROUND

In existing liquid crystal display (LCD) panels, backlight sources are usually direct type backlights, or edge type backlights. These two types of backlight sources can generate white light and different color gamut ranges by using blue Light-Emitting Diodes (LEDs) to excite different phosphors. Commonly sued phosphors include yellow (Y) phosphor, red and yellow (RY) phosphor, red and green (RG) phosphor, fluorine potassium silicate (KSF) phosphor, etc.

Currently, multiple LED lights on a same backlight unit (BLU) use a same phosphor, which may be cooperated with color films to generate different color gamut. Typically, the Y phosphor can achieve 62% of the National Television Standards Committee (NTSC) color gamut. The YR phosphor can generally achieve 72% of the NTSC color gamut. The RG phosphor can generally achieve 82% of the NTSC color gamut. The KSF phosphor can generally achieve more than 100% of the NTSC color gamut.

However, when a specific percentage, such as 78%, of the NTSC color gamut is required, or when the color films have some special conditions, using a single phosphor may not satisfy the color gamut requirement. On the other hand, using another phosphor may exceed the color gamut requirements. In this case, a re-production of a new phosphor may be processed, which can inevitably lead to a longer product development cycle, thereby reducing the production efficiency.

BRIEF SUMMARY

In accordance with some embodiments of the disclosed subject matter, a backlight source, a related backlight unit, a related display apparatus, and fabricating methods thereof are provided.

An aspect of the disclosed subject matter provides a backlight source for a display panel, comprising: a light-bar; and a plurality of first light sources and a plurality of second light sources alternatively located on the light-bar in a staggered arrangement; wherein the plurality of first light sources use a first type phosphor that is able to realize a first color gamut range, while the plurality of second light sources use a second type phosphor that is able to realize a second color gamut range.

In some embodiments, the plurality of first light sources and the plurality of second light sources are light-emitting diodes.

In some embodiments, the plurality of first light sources and the plurality of second light sources are arranged alternatingly one by one on the light-bar.

In some embodiments, each of the first type phosphor and the second type phosphor is selected from a group of yellow phosphor, red and yellow phosphor, red and green phosphor, and fluorine potassium silicate phosphor.

In some embodiments, the plurality of first light sources use the red and yellow phosphor, while the plurality of second light sources use the red and green phosphor.

Another aspect of the disclosed subject matter provides a backlight unit, comprising: a light guide plate; and a disclosed backlight source.

In some embodiments, a plurality of first serrations and a plurality of second serrations are fabricated on a light incident side of the light guide plate; each first serration is located close to a corresponding first light source to diffusely reflect an emitted light from the first light source; and each second serration is located close to a corresponding second light source to diffusely reflect an emitted light from the second light source.

In some embodiments, each first serration includes a plurality of first dots having spherical surfaces; each second serration includes a plurality of second dots having spherical surfaces; and a diameter of each first dot is less than a diameter of each second dot.

Another aspect of the disclosed subject matter provides a display apparatus, comprising a disclosed backlight unit.

Another aspect of the disclosed subject matter provides a method for fabricating a backlight source, comprising: forming an printed circuit board; and alternatingly arranging a plurality of first light sources and a plurality of second light sources located on the printed circuit board in a staggered arrangement; wherein the plurality of first light sources use a first type phosphor that is able to realize a first color gamut range, while the plurality of second light sources use a second type phosphor that is able to realize a second color gamut range.

In some embodiments, the plurality of first light sources and the plurality of second light sources are light-emitting diodes; and each of the first type phosphor and the second type phosphor is selected from a group of yellow phosphor, red and yellow phosphor, red and green phosphor, and fluorine potassium silicate phosphor.

In some embodiments, the plurality of first light sources and the plurality of second light sources are arranged alternatingly one by one on the aluminum printed circuit board.

Another aspect of the disclosed subject matter provides a method for fabricating a backlight unit, comprising: forming a light guide plate; forming a plurality of first serrations and a plurality of second serrations on a light incident side of the light guide plate; and forming a backlight source according to the disclosed method.

In some embodiments, each first serration is located close to a corresponding first light source to diffusely reflect an emitted light from the first light source; and each second serration is located close to a corresponding second light source to diffusely reflect an emitted light from the second light source.

In some embodiments, each first serration includes a plurality of first dots having spherical surfaces; each second serration includes a plurality of second dots having spherical surfaces; and a diameter of each first dot is less than a diameter of each second dot.

Other aspects of the disclosed subject matter can be understood by those skilled in the art in light of the description, the claims, and the drawings of the present disclosure.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

Figure 1:
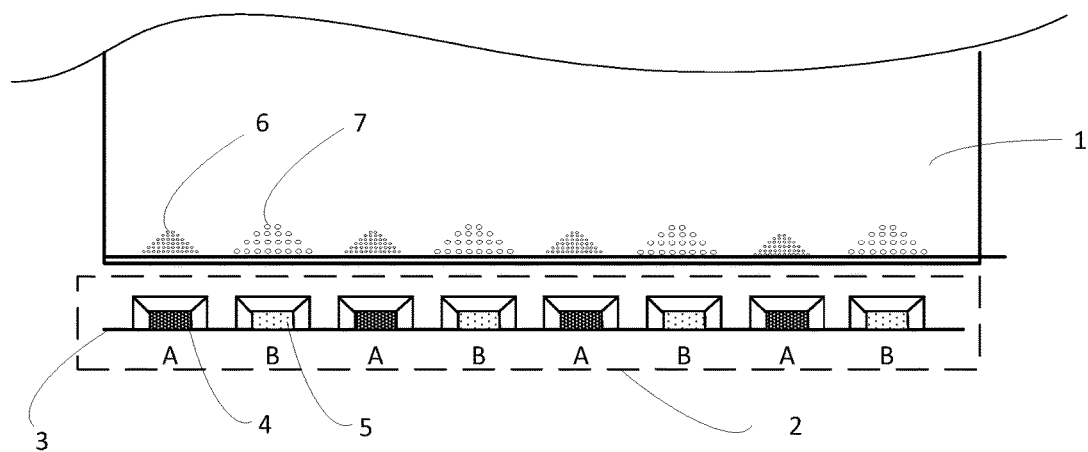
FIG. 1 is a schematic structural diagram of an exemplary backlight unit in accordance with some embodiments of the disclosed subject matter.

For those skilled in the art to better understand the technical solution of the disclosed subject matter, reference will now be made in detail to exemplary embodiments of the disclosed subject matter, which are illustrated in the accompanying drawings. Wherever possible, the same reference numbers will be used throughout the drawings to refer to the same or like parts.

Currently, LED lights can only use a single phosphor. The commonly used phosphors, such as Y phosphor, YR phosphor, RG phosphor, and KSF phosphor, can realize different color gamut. When a required color gamut value is not within the color gamut ranges that can be realized by the above mentioned phosphors, a new type of phosphor has to be re-produced. After the new type of phosphor has been re-produced, an LED light-bar can be fabricated to obtain a backlight source. Obviously, it may lead to a long product development cycle, thereby reducing the production efficiency.

The disclosed subject matter provides a backlight source, a related backlight unit, a related display apparatus, and fabricating methods thereof in accordance with various embodiments. In the disclosed backlight source, multiple light sources, such as LEDs using different phosphors, can be packaged in a mixed way on a light-bar. As such, a backlight unit that satisfies different color gamut requirements can be realized, and thus can meet different color gamut displays demands.

In some embodiments, the disclosed backlight source can include a light-bar, multiple first light sources, and multiple second light sources. The multiple first light sources and second light sources can be arranged on the light-bar at predetermined intervals. The multiple first light sources can use a first phosphor, and the multiple second light sources can use a second phosphor. The second phosphor is different from the first phosphor.

Since the multiple first and second light sources respectively use two different phosphors that can achieve different color gamut values, the light-bar including integrated multiple first light sources and second light sources can realize a specific color gamut value between the two color gamut ranges and corresponding to the two different phosphors.

In some embodiments, the multiple first light sources and the multiple second light sources can be light emitting diodes (LEDs). In some other embodiments, the multiple first light sources and the multiple second light sources can be any other suitable light sources.

It should be noted that, any suitable arrangement can be used for positioning the multiple first light sources and second light sources at the predetermined intervals. For example, the multiple first light sources and second light sources can be arranged alternatingly one by one. That is, each first light source can be arranged next to a second light source. As another example, a number M of first light sources can be arranged successively, and then a number N of second light sources can be arranged successively. As a specific example, three first light sources and two second light sources can be arranged at the predetermined intervals, and the arrangement can be repeated. In some other embodiments, any suitable arrangement that can mix the multiple first light sources and second light sources can be used.

It should be noted that, the alternately spaced multiple first light sources and second light sources on the light-bar can have a uniformly distributed color gamut. Therefore, the realized display effect can be soft and thereby can enhance a viewer's experience level.

In some embodiment, the first phosphor and the second phosphor can be selected from Y phosphor, YR phosphor, RG phosphor, and KSF phosphor. That is, any two of the commonly used phosphors can be used to achieve a different color gamut range.

In some other embodiment, three or more of these commonly used phosphors can be used to achieve a different color gamut range. However, it is not necessary to do so. Because a color gamut value that can be realized by using three different phosphors is generally close to a median color gamut value of the three color gamut ranges corresponding to the three different phosphors. Basically, the median color gamut value can be realized by using only the one of the three phosphors that corresponds to the color gamut range in the middle.

In one embodiment, as an example only for description purpose but not for limiting the disclosed subject, the first phosphor is selected as the YR phosphor, and the second phosphor is selected as the RG phosphor.

Referring to FIG. 1, a schematic structural diagram of an exemplary backlight unit is provided in accordance with some embodiments of the disclosed subject matter.

As illustrated, the backlight unit include a light guide plate (LGP) 1 and a backlight source 2. The backlight source 2 can include at least one light-bar. The light-bar includes multiple first light sources 4 and multiple second light sources 5. The first light sources 4 can be A-type LEDs, and the second light sources 5 can be B-type LEDs. A-type LEDs and B-type LEDs use different phosphors, and can generate different lights within different color gamut ranges. Therefore, the combined light generated by the light-bar can have a color gamut value that cannot be realized by only using A-type LEDs or B-type LEDs.

In some embodiments, the disclosed backlight source can have an adjustable color gamut value. Two different types of LED using different types of phosphors can be alternatingly arranged on an aluminum printed circuit board (PCB) 3. In one embodiment, by using Y phosphor and YR phosphor, a 68% of the color gamut can be achieved. It should be noted that, different color gamut values can be achieved by using various combinations of different phosphors and different color films.

When being excited by a same type of LEDs, different phosphors can have different excitation efficiency. Thus, the first light sources 4 and the second light sources 5 can have different brightness. For example, an LED using the YR phosphor can have a 12%-15% higher luminance than a LED using the RG phosphor. Therefore, a hotspot phenomenon of the display may occur at the locations of the LGP 1 that are close to the multiple light sources 4 and 5, where the light emitted from each of the light sources 4 and 5 is rarely mixed.

In order to eliminate the hotspot phenomenon, the disclosed backlight unit can include an improved design described in the following. As illustrated in FIG. 1, multiple first serrations 6 and second serrations 7 can be fabricated on the light incident side of the LGP 1. The multiple first serrations 6 can be fabricated on locations that correspond to the locations of the first light sources 4, e.g., A-type LEDs. The multiple second serrations 7 can be fabricated on locations that correspond to the locations of the second light sources 5, e.g., B-type LEDs. The multiple first serration 6 and second serrations 7 can evenly scatter the incident light emitted from the first light sources 4 and the second light sources 5 in to the LGP 1.

In some embodiments, each first serration 6 has a first reflecting surface that can reflect the incident light from the corresponding first light source towards an light output surface. Each second serration 7 has a second reflecting surface that can reflect the incident light from the corresponding second light source towards the light output surface.

A summation of the areas of the multiple first reflecting surfaces of the first serrations 6 is less than a summation of the areas of the multiple second reflecting surfaces of the second serrations 7.

The above design can adjust the brightness of the incident lights emitted from both type of light sources at the locations of the LGP 1 that are close to the light sources. Therefore, the luminance can be more uniform, and the hotspot phenomenon can be minimized or eliminated.

In some embodiments, each first serration 6 and second serration 7 can include partially-spherical surfaces. The partially-spherical surfaces of the serrations can evenly reflect and scatter the incident light. In some other embodiments, the first serrations 6 and second serrations 7 can include irregular convex surfaces. The irregular convex surfaces can also scatter the incident light, and make the illumination more soft and uniform.

Figure 2:
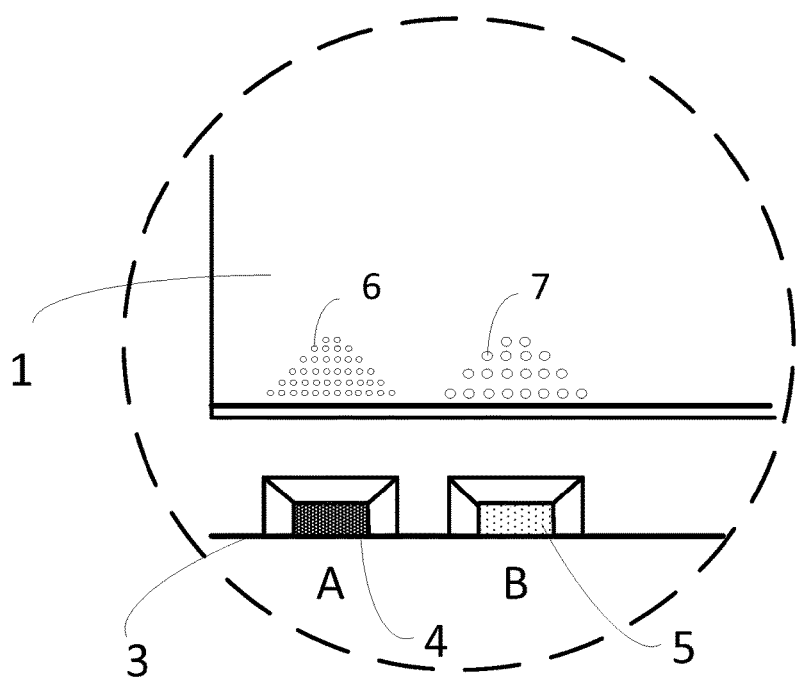
FIG. 2 is an enlarged schematic view of a portion of an exemplary backlight unit in accordance with some embodiments of the disclosed subject matter.

Referring to FIG. 2, an enlarged schematic view of a portion of the exemplary backlight source is shown in accordance with some embodiments of the disclosed subject matter.

As illustrated, both the first serration 6 and the second serration 7 include multiple dots having spherical surfaces. In some embodiments, the diameter R1 of each dot of the first serration 6 is less than the diameter R2 of each dot of the second serration 7.

Since each dot of the first serration 6 has a smaller diameter, the first serration 6 can have a smaller reflecting surface. Thus, the first serration 6 can reflect less incident light emitted from the first light source 4. Each dot of the second serration 7 has a larger diameter, the second serration 7 can have a larger reflecting surface. Thus, the second serration 7 can reflect more incident light emitted from the second light source 5.

Since the first light source 4 can emit a brighter light by using the YR phosphor, while the first serration 6 can reflect less incident light emitted from the first light source 4, and the second light source 5 can emit a less bright light by using the RG phosphor, while the second serration 7 can reflect more incident light emitted from the second light source 5, the brightness of a position of the light-bar 2 that close to the first light source 4 can be approximately equal to the brightness of a position of the light-bar 2 that close to the second light source 5. Therefore, the illumination of the light-bar 2 can be more evenly and uniformly distributed.

Further, as illustrated in FIG. 2, in each first serration 6, the number of dots decrease when the distance becomes larger from the first light source 4. Similarly, in each second serration 7, the number of dots decrease when the distance becomes larger from the second light source 5. Based on this design, the incident lights emitted from the first light source 4 and the second light source 5 can be mixed together at the locations that are close to the incident side of the LGP 1. Therefore, the hotspot phenomenon can be further eliminated.

In some embodiments, the reflecting surface of the LGP 1 can be fabricated to include multiple small serrations that can scatter the light and make a uniform illumination.

In accordance with some embodiments of the disclosed subject matter, a display apparatus including a backlight unit described above can be provided. The display apparatus can be any suitable device that has a display function, such as a mobile phone, a tablet computer, a television, a monitor, a notebook computer, a digital camera, a digital picture frame, a navigation system, etc.

In a special example, as illustrated in FIGS. 1 and 2, A-type LEDs and B-type LEDs are alternatingly arranged on the aluminum PCB 3 to form an entire light-bar 2. The following testing data can be obtained based on the above arrangement.

| Item |   | YR | RG | KSF | YR + KSF | RG + KSF | RG + YR |
|------|---|------|------|------|----------|----------|---------|
| R | x | 0.6343 | 0.651 | 0.673 | 0.6613 | 0.664 | 0.6456 |
|   | y | 0.3396 | 0.335 | 0.315 | 0.3274 | 0.3233 | 0.3395 |
| G | x | 0.2977 | 0.286 | 0.238 | 0.2825 | 0.2729 | 0.2947 |
|   | y | 0.6206 | 0.623 | 0.672 | 0.646 | 0.645 | 0.6252 |
| B | x | 0.1538 | 0.149 | 0.144 | 0.1533 | 0.1513 | 0.1508 |
|   | y | 0.0661 | 0.061 | 0.068 | 0.0654 | 0.0678 | 0.0671 |
| W | x | 0.3122 | 0.318 | 0.302 | 0.3447 | 0.3423 | 0.3354 |
|   | y | 0.3302 | 0.329 | 0.394 | 0.3674 | 0.3592 | 0.3633 |
| NISC |  | 72.80% | 77.00% | 91% | 82.50% | 83.70% | 75% |
| SRGB |  | 97.7% | 99.8% | 96.7% | 99.8% | 99.6% | 97.2% |

For example, when the A-type LEDs use YR phosphor and the B-type LEDs use RG phosphor, as shown in the very right column of the above table, a final color gamut value of 75% of the National Television Standards Committee (NTSC) color gamut can be achieved.

Based on the above shown data, the disclosed backlight units using a light-bar including multiple light sources using different phosphors can realize desired color gamut values that satisfies different display requirements.

In some embodiments, when a required color gamut value is not within the color gamut ranges that can be realized by existing phosphors, multiple light sources using two types of phosphors can be packaged in a mixed way on a light-bar. As such, a backlight unit that is able to realize the required color gamut value can be fabricated to satisfy the corresponding displays demands. No re-production of a new phosphor is necessarily required. Thus, the production efficiency can be improved, and the production cost can be reduced.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, a backlight source, a related backlight unit, a related display apparatus, and fabricating methods thereof are provided. The disclosed backlight source for a display panel can comprises a light-bar and multiple first light sources and second light sources alternatively located on the light-bar in a staggered arrangement. The first light sources use a first type phosphor that is able to realize a first color gamut range, the second light sources use a second type phosphor that is able to realize a second color gamut range In some embodiments, the first light sources and second light sources can be light-emitting diodes, and are arranged alternatingly one by one on the light-bar.

In some embodiments, each of the first type phosphor and the second type phosphor is selected from a group of yellow phosphor, red and yellow phosphor, red and green phosphor, and fluorine potassium silicate phosphor.

In some embodiments, the first light sources use the red and yellow phosphor, and the second light sources use the red and green phosphor.

The disclosed backlight unit can comprises a light guide plate and a disclosed backlight source. Multiple first serrations and second serrations are fabricated on a light incident side of the light guide plate. Each first serration is located close to a corresponding first light source to diffusely reflect an emitted light from the first light source, and each second serration is located close to a corresponding second light source to diffusely reflect an emitted light from the second light source.

In some embodiments, each first serration includes a plurality of first dots having spherical surfaces, each second serration includes a plurality of second dots having spherical surfaces, and a diameter of each first dot is less than a diameter of each second dot.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A backlight unit, comprising:
   a light guide plate;
   a light-bar;
   a plurality of first light sources and a plurality of second light sources alternatively located on the light-bar in a staggered arrangement; and
   a plurality of first serrations and a plurality of second serrations arranged on a light incident side of the light guide plate,
   wherein:
      the plurality of first light sources include a first phosphor that is able to realize a first color gamut range, and the plurality of second light sources include a second phosphor that is able to realize a second color gamut range,
      each first serration includes a plurality of first dots having spherical surfaces, and each second serration includes a plurality of second dots having spherical surfaces,
      a diameter of each first dot is less than a diameter of each second dot so that a reflecting surface of each second dot is greater than a reflecting surface of each first dot, and
      in each first serration, a number of the first dots in a row decreases when a distance becomes larger from the first light source, and in each second serration, a number of the second dots in a row decreases when a distance becomes larger from the second light source so as to eliminate a hotspot phenomenon.

2. The backlight unit of claim 1, wherein the plurality of first light sources and the plurality of second light sources are light-emitting diodes.

3. The backlight unit of claim 1, wherein the plurality of first light sources and the plurality of second light sources are arranged alternatingly one by one on the light-bar.

4. The backlight unit of claim 1, wherein each of the first phosphor and the second phosphor is selected from a group consisting of yellow phosphor, red and yellow phosphor, red and green phosphor, and fluorine potassium silicate phosphor.

5. The backlight unit of claim 1, wherein:
   each first serration is located close to a corresponding first light source to diffusely reflect an emitted light from the first light source; and
   each second serration is located close to a corresponding second light source to diffusely reflect an emitted light from the second light source.

6. A display apparatus, comprising the backlight unit according to claim 1.

7. The backlight unit of claim 4, wherein the first phosphor is the red and yellow phosphor, and the second phosphor is the red and green phosphor.

8. A method for fabricating a backlight unit, comprising:
   forming a printed circuit board;
   alternatingly arranging a plurality of first light sources and a plurality of second light sources located on the printed circuit board in a staggered arrangement;
   forming a light guide plate; and
   forming a plurality of first serrations and a plurality of second serrations on a light incident side of the light guide plate,
   wherein:
      the plurality of first light sources include a first phosphor that is able to realize a first color gamut range, and the plurality of second light sources include a second phosphor that is able to realize a second color gamut range,
      each first serration includes a plurality of first dots having spherical surfaces, and each second serration includes a plurality of second dots having spherical surfaces,
      a diameter of each first dot is less than a diameter of each second dot so that a reflecting surface of each second dot is greater than a reflecting surface of each first dot, and
      in each first serration, a number of the first dots in a row decreases when a distance becomes larger from the first light source, and in each second serration, a number of the second dots in a row decreases when a distance becomes larger from the second light source so as to eliminate a hotspot phenomenon.

9. The method of claim 8, wherein:
the plurality of first light sources and the plurality of second light sources are light-emitting diodes; and
each of the first phosphor and the second phosphor is selected from a group consisting of yellow phosphor, red and yellow phosphor, red and green phosphor, and fluorine potassium silicate phosphor.

10. The method of claim 8, wherein the plurality of first light sources and the plurality of second light sources are arranged alternatingly one by one on the printed circuit board, the printed circuit board being an aluminum printed circuit board.

11. The method of claim 8, wherein:
each first serration is located close to a corresponding first light source to diffusely reflect an emitted light from the first light source; and
each second serration is located close to a corresponding second light source to diffusely reflect an emitted light from the second light source.

* * * * *